(No Model.)
T. E. GOLDEN.
SHAFT HANGER.
No. 407,347. Patented July 23, 1889.
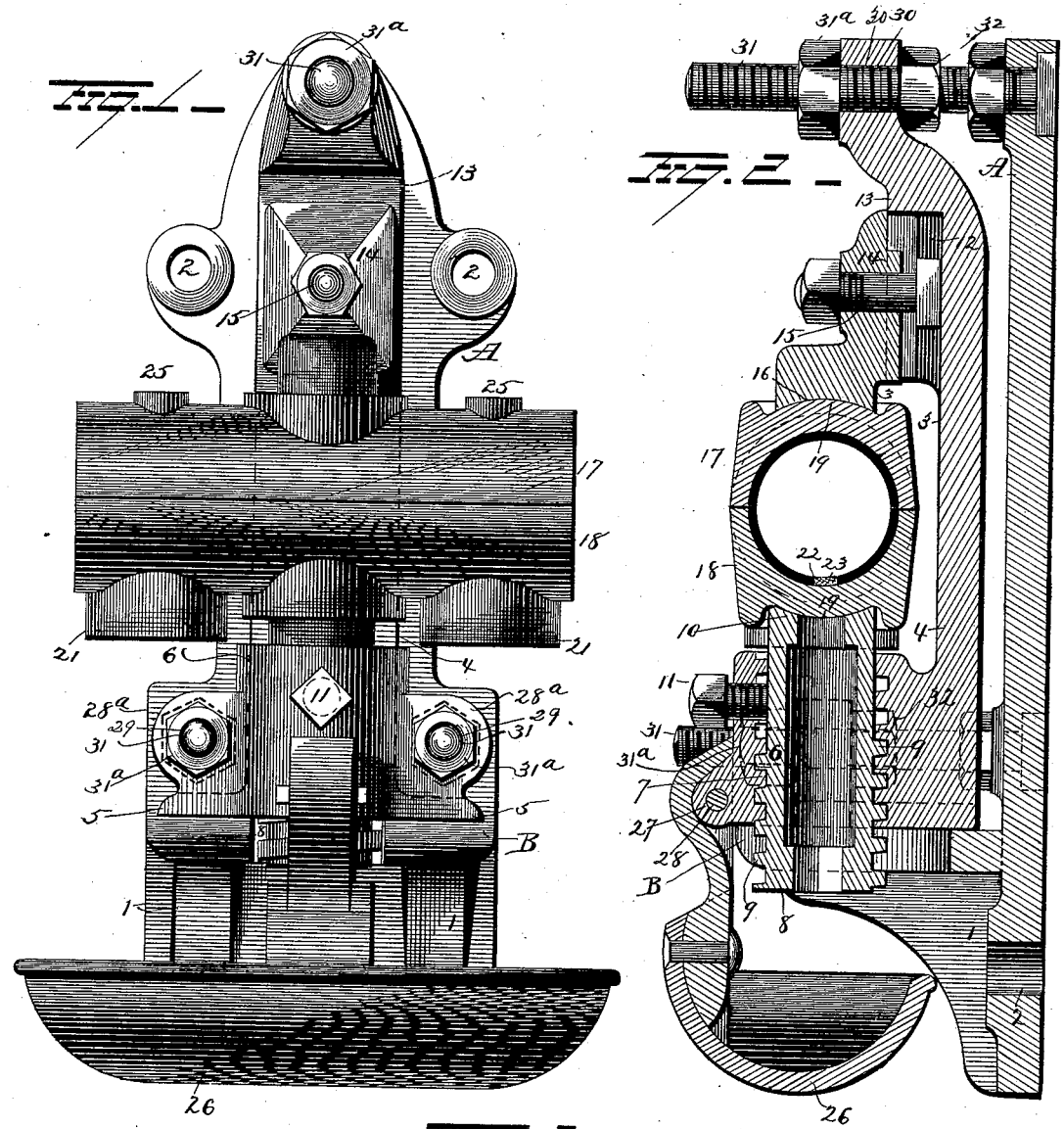
Witnesses
E. J. Nottingham
Geo. F. Downing
Inventor
Theodore E. Golden
By his Attorney
H. A. Seymour

UNITED STATES PATENT OFFICE.

THEODORE E. GOLDEN, OF COLUMBUS, GEORGIA.

SHAFT-HANGER.

SPECIFICATION forming part of Letters Patent No. 407,347, dated July 23, 1889.

Application filed February 21, 1889. Serial No. 300,666. (No model.)

*To all whom it may concern:*

Be it known that I, THEODORE E. GOLDEN, of Columbus, in the county of Muscogee and State of Georgia, have invented certain new and useful Improvements in Shaft-Hangers; and I do hereby declare the following to be a full, clear, and exact description of the invention, such as will enable others skilled in the art to which it appertains to make and use the same.

My invention relates to an improvement in shaft-hangers.

The object is to provide means whereby the bearings may be readily shifted within a reasonable distance to suit the position of the shaft supported thereon without moving the entire hanger; and with this end in view my invention consists in certain novel features of construction and combinations of parts, as will be hereinafter fully described, and pointed out in the claims.

In the accompanying drawings, Figure 1 is a view in elevation of my improved hanger. Fig. 2 is a vertical cross-section, and Fig. 3 shows the interior, of one of the bearing-sections.

A represents a bracket or plate, and B a shelf or step formed integral therewith. The latter is cut out to form a U-shaped recess in its center, to be further mentioned, and the webs 1, integral with the bracket and its shelf, furnish supports for the latter. This entire piece may be of cast metal or similar material, it only being necessary that it should be substantial and capable of sustaining considerable weight. The plate A is furnished with several bolt-holes 2, adapted to receive bolts or similar devices for fastening the hanger to a support. The yoke 3 rests upon shelf B of the bracket or plate A, with its back 4 parallel with said bracket, and is provided with an enlarged base 6, having a screw-threaded socket 7. A plug 8 is provided with screw-threads 9, adapted to turn in the socket 7, whereby the plug is raised or lowered. This plug is long enough so that its lower end usually extends down through the U-shaped recess and has a hollow bore, and at its upper end is provided with a circular concaved step 10. The lower end of the bore of the plug is made angular, preferably square, instead of round, to receive a key or other instrument by which the plug may be easily turned during adjustment. A set-screw 11 in the side of the screw-socket is provided for locking the plug when it has reached the desired position. The back of the yoke terminates at its upper end in a flat seat 13. This flattened seat is provided with an open slot 12, and said slot is undercut inside of the yoke to receive the head or nut of a bolt 15. An adjustable plate 14, having a flat face which rests upon the flat seat 13, is held to the yoke by a bolt 15. This adjustable plate is provided with a circular concaved bearing 16, corresponding with the step 10, similar in shape and facing the latter. By loosening the head or nut on bolt 15 this bearing 16 may be adjusted, and it may be locked in the required position by tightening the nut.

The bearing-sleeve is made in half-sections 17 and 18. These sections are similar to each other in shape and size; but in one or two particulars differ from each other. These points of difference will now be set forth. In the first place the two sections when placed around a shaft form a cylindrical box and the sections have a circular projection 19 on their backs opposite each other adapted to rest in the step 10 and bearing 16. The bearing-sections being placed around the shaft in proper position, the seats are raised or lowered to the required position in the manner previously described. Inside these box-sections are lined with Babbitt metal or other packing material, and in the lower section holes 20 are formed through this lining metal into the oil-cups 21 below. In running the Babbitt or other metal into the sections a groove 22 is formed between the holes 20. A narrow wick 23 of textile material is placed in this groove, and the ends of this extend down through holes 20 into the oil-cups 21. The wick may be doubled provided the groove 22 is sufficiently deep, and as this wick bears upon the shaft supported in the box it is constantly lubricated with oil from the cups. Annular grooves 40 are formed in the ends of the box, and a hole 24 in each of these grooves extends into the oil-cup below. The oil may be supplied to the bearing either through these holes 24 or through the holes 25 in the upper section. The drip pan or cup 26 is held to a projection 27 on the yoke by a pin or similar device 28 passing through said parts.

On each side of the screw-socket 6 the ears 28ª project laterally, and these ears are provided with bolt-holes 29. The upper end of the yoke is also provided with a bolt-hole 30. In corresponding positions to these holes threaded bolts 31 project forward from the bracket A. The yoke 3 is placed on these bolts, the bolts passing through holes 29 and 30, and said bolts are each provided with two nuts 31ª and 32, one being located on each side of the yoke. The function of these nuts is to remove the shaft-bearing sections horizontally or at right angles to the adjustment by the step 10 and bearing 16. By simply unscrewing the outside nuts 31ª and then the inside nuts 32 the yoke is forced outward on the bolts, and by screwing the nuts on in reverse order the yoke is forced inward.

Thus from the construction described it is seen that the shaft-bearing sections may be raised, lowered, moved outward or inward, or swung laterally to a limited degree, thereby obviating the necessity of changing the position of the whole hanger and rendering the adjustment of different parts comparatively easy.

It is evident that slight changes might be resorted to in the form and arrangement of the several parts described without departing from the spirit and scope of my invention; hence I do not wish to limit myself to the precise construction herein set forth; but, Having fully described my invention, what I claim as new, and desire to secure by Letters Patent, is—

1. In a shaft-hanger, the combination, with a bracket and a yoke adjustable toward and away therefrom, of upper and lower bearings mounted on the yoke and adjustable in a direction at right angles to the direction of movement of the yoke, and a box carried by said bearings.

2. In a shaft-hanger, the combination, with a bracket, a yoke adjustable laterally toward and away from the bracket, and lock-nuts for locking the yoke, of upper and lower bearings carried by the yoke and adjustable at right angles to the direction of movement of the yoke, devices for locking the bearings in position, and a box located between and supported by said bearings.

3. In a shaft-hanger, the combination, with a bracket having a slotted shelf, a yoke movable toward and away from said bracket, bearings carried by said yoke and movable in a direction at right angles to the direction of movement of the yoke, screws for locking said bearings in position, and a box located between and supported by said bearings, substantially as set forth.

4. In a shaft-hanger, the combination, with a bracket, of a yoke secured thereto and movable toward and away therefrom, bearings secured to the yoke and adjustable in a direction at right angles to the direction of movement of the yoke, and a sectional box secured between the bearings, substantially as set forth.

5. In a shaft-hanger, the combination, with a fixed plate having a shelf and screw-threaded bolts, a yoke supported on the shelf, and nuts on each side of the yoke by which the latter is moved inward or outward, of a screw-step in the yoke, means for locking it, an adjustable bearing, means for locking it, and a sectional shaft-box supported between the screw-step and adjustable bearing, substantially as set forth.

In testimony whereof I have signed this specification in the presence of two subscribing witnesses.

THEODORE E. GOLDEN.

Witnesses:
GEO. C. BATES,
A. O. BLACKMAR.